United States Patent [19]
Tochiyama

[11] Patent Number: 5,946,155
[45] Date of Patent: *Aug. 31, 1999

[54] DISK APPARATUS USING STOP PATTERNS TO RELIABLY DETERMINE A STOP POSITION

[75] Inventor: Kazunori Tochiyama, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,319

[22] Filed: Dec. 23, 1996

Related U.S. Application Data

[63] Continuation of application No. 08/414,579, Mar. 31, 1995, abandoned.

[30] Foreign Application Priority Data

Jun. 24, 1994 [JP] Japan .................................. 6-142896

[51] Int. Cl.⁶ .................................................. G11B 15/48
[52] U.S. Cl. ...................... 360/74.4; 360/74.1; 360/73.03
[58] Field of Search ................................. 360/74.4, 74.5, 360/74.1, 75, 77.05, 73.03, 77.03, 78.11, 77.08; 318/138, 254, 439

[56] References Cited

U.S. PATENT DOCUMENTS

| | | | |
|---|---|---|---|
| 4,123,788 | 10/1978 | Kruger | 360/77.03 |
| 4,839,754 | 6/1989 | Gami | 360/73.01 |
| 4,876,491 | 10/1989 | Squires | 318/158 |
| 4,922,169 | 5/1990 | Freeman | 318/254 |
| 5,235,264 | 8/1993 | Kaneda | 360/73.03 |
| 5,276,569 | 1/1994 | Even | 360/73.03 |
| 5,371,637 | 12/1994 | Yamada | 360/73.03 |
| 5,453,887 | 9/1995 | Negishi | 360/77.08 |
| 5,633,569 | 5/1997 | Chloupek et al. | 318/430 |
| 5,633,570 | 5/1997 | Motzko | 318/439 |

FOREIGN PATENT DOCUMENTS

| | | | |
|---|---|---|---|
| 56037865 | 4/1981 | Japan . | |
| 173691 | 8/1986 | Japan | 360/73.03 |
| 63-117378 | 5/1988 | Japan | 360/75 |
| 4351752 | 12/1992 | Japan . | |
| 290500 | 11/1993 | Japan | 360/73.03 |

OTHER PUBLICATIONS

Principles of Digital Audio by Poklmann, published 1989 pp. 230–236.

Electric Motors and Their Controls by Kenjo, published 1991 pp. 107–110.

*Primary Examiner*—Alan Faber
*Attorney, Agent, or Firm*—Greer, Burns & Crain Ltd.

[57] ABSTRACT

Three kinds of stop patterns are recorded at the same cylinder position of at least three recording surfaces of disk media. Each pattern is a division pattern in which one circumference is divided into two portions and which are recorded therein. Phases of the division patterns are sequentially deviated in the circumferential direction every 120°. When a motor is activated, the motor stop position is detected on the basis of the stop patterns of the disk media and activating conditions to rotate the motor in a predetermined direction, thereby activating the brushless DC motor having no Hall sensor.

13 Claims, 16 Drawing Sheets

FIG. 15

| STATUS | STOP POSITION DETECTION INFORMATION | COIL CURRENT DIRECTION ||| TRANSISTOR OPERATING STATE ||||||
|---|---|---|---|---|---|---|---|---|---|---|
| | | 26-1 | 26-2 | 26-3 | 78-1 | 78-2 | 78-3 | 78-4 | 78-5 | 78-6 |
| ① | 101 | | INFLOW | OUTFLOW | | ○ | | | | ○ |
| ② | 100 | INFLOW | | OUTFLOW | ○ | | | | | ○ |
| ③ | 110 | INFLOW | OUTFLOW | | ○ | | | | ○ | |
| ④ | 010 | | OUTFLOW | INFLOW | | | ○ | | ○ | |
| ⑤ | 011 | OUTFLOW | | INFLOW | | | ○ | ○ | | |
| ⑥ | 001 | OUTFLOW | INFLOW | | | ○ | | ○ | | |

DISK APPARATUS USING STOP PATTERNS TO RELIABLY DETERMINE A STOP POSITION

This application is a continuation of application Ser. No. 08/414,579 filed on Mar. 31, 1995, now abandoned which designated the U.S.

BACKGROUND OF THE INVENTION

The present invention relates to a disk apparatus for rotating disk media by a brushless DC motor having no Hall element and, more particularly, to a disk apparatus for always rotating and activating in a specified direction without reversely rotating a motor upon activation.

In recent years, in a magnetic disk apparatus or optical disk apparatus or the like, in order to realize a small size and a high performance of the apparatus, a reduction in number of parts due to an integration of parts used, an exclusion of unnecessary parts, and the like is actively performed. Thus, as for a spindle motor which is used for rotation of the disk media, a high speed, a low electric power consumption, and low costs are being realized.

Hitherto, a brushless DC motor is used as a spindle motor of the disk apparatus. A Hall sensor is used for a speed control and a confirmation of the stop position upon activation of such a brushless DC motor. In case of the brushless DC motor of three-phase windings which is ordinarily used, three Hall sensors are fixedly arranged on the winding side with intervals of 120° or 60°, a current supply timing of a coil is controlled on the basis of a detection signal when a rotor magnetic pole passes through each Hall sensor, thereby rotating the motor in the specified direction at a predetermined rotational speed.

Due to the miniaturization and the realization of the high performance of the apparatus, however, the use of a brushless DC motor having no Hall sensor has begun. According to such a DC motor, since it is unnecessary to assemble the Hall sensor in the motor, the motor can be miniaturized by the space of such a Hall sensor. Since an assembling space of the Hall sensor can be used to install a stator coil, the torque can be increased.

As for a rotation control of the brushless DC motor having no Hall sensor, a counter electromotive force which is generated in the coil by the motor rotation is detected and the current supply timing of the coil is controlled on the basis of the counter electromotive force detection signal, thereby rotating the motor in the specified direction at a predetermined rotational speed. On the other hand, in an activation control, first, a pulse current is supplied to a specific coil phase. When the rotor stops in a dead zone of the stator coil, the motor cannot be activated. In order to avoid such a situation, however, the position of the rotor is again decided by a pulse driving and the rotor is moved out from the dead zone. Subsequently, a synchronous (referred to as a "sync") control is performed until the counter electromotive force detection signal is obtained from the coil. The counter electromotive force detection signal is made valid after the motor rotational speed rises to about 1000 to 2000 r.p.m. Since there is no timing signal serving as a reference for a period of time of a low rotational speed so far, the sync control for switching the current supply to the coil at a timing synchronized with a pulse having a specific frequency obtained from a clock pulse is executed. When the rotational speed rises and the counter electromotive force detection signal is made valid during the sync control, the current supply to the coil is switched at the timing based on the counter electromotive force detection signal, thereby leading the rotation. When the rotational speed reaches a specified rotational speed of, for example, 5400 r.p.m., a speed lock-on (notification of the completion of the activation) is raised, thereby starting a control mode of a stationary rotation.

In order to rotate the motor in the specified direction from the stop state of the motor, the stop position of the motor has to be known. However, the counter electromotive force of the coil becomes a signal having a level that can be used in the timing control only when the motor rotational speed exceeds, for example, 1000 r.p.m. Consequently, the stop position cannot be confirmed by the detection signal of the counter electromotive force and the rotating direction of the motor cannot be decided upon activation.

According to the conventional activation control, since the stop position of the rotor for the coil is not known, the current supply to the coil is started in accordance with the order which has fixedly been decided. There is, accordingly, a case where the motor reversely rotates depending on the stop position of the rotor although it doesn't happen every activation. In case of a three-phase and two-pole brushless DC motor in which the rotor has only the S and N poles, a probability of such a reverse rotation is equal to ½. When the spindle motor reversely rotates, according to the circumstances, there is a case where the heads and the disk media are damaged. In case of a large damage, it causes a serious damage such as a loss of internal data or the like. Although a countermeasure for reduction of the damage for the reverse rotation of the spindle motor has been taken for the heads and disk media, such a countermeasure is not always perfect. In order to increase degrees of freedom of the heads, disk media, and housing structure, the activation control of the spindle motor which doesn't cause a reverse rotation is necessary.

SUMMARY OF THE INVENTION

According to the invention, there is provided a disk apparatus in which, even if a brushless DC motor having no Hall sensor is used as a spindle motor, the motor can always be rotated in a specified direction without reversely rotating.

According to the disk apparatus of the invention, a brushless DC motor having rotors of (n) poles and three-phase coils is used as a spindle motor. A stop pattern indicative of a stop position of the rotor of the DC motor is recorded on a disk medium which is rotated by the DC motor. When the motor is stopped, a head positioning control section positions heads to recording positions of the stop patterns of the disk media and, during a stationary rotation of the DC motor, moves and positions head means to an arbitrary position on the disk media. At the time of the activation of the motor, an activation control section detects the motor stop position on the basis of the stop patterns of the disk media and sets activating conditions to rotate the motor in a predetermined direction.

As stop patterns of the disk media, a first pattern, a second pattern, and a third pattern are recorded at the same cylinder position on at least three recording surfaces of the disk media. Each of the first, second, and third patterns is a division pattern recorded by dividing a circumference into two portions. Further, each division pattern is recorded in accordance with the order by deviating the phase in the circumferential direction every 120°.

In the case where the disk medium is a magnetic recording medium, each division pattern is the pattern in which one circumference is divided into two portions and the S and N poles are recorded therein. It is also possible to divide the circumference into two portions and to record strong and weak states of the magnetization therein. It is also possible to divide the circumference into two portions and to record magnetization inversion states of different frequencies therein. Further, the disk medium can also be applied to an optical recording medium. In such a case, each division pattern is a pattern in which one circumference is divided into two portions and optically different information is recorded therein.

The stop patterns of the disk media are recorded at cylinder positions at which the heads are positioned when the rotation of the disk media is stopped. The stop pattern can be recorded by an amount of one cylinder or can be recorded by an amount of a plurality of cylinders in order to assure a redundancy. In case of the magnetic disk apparatus, the stop pattern is recorded in a contact start/stop region on the disk surface with which a magnetic head is come into contact when the rotation of the magnetic disk media is stopped.

An activation control section comprises: a stop pattern detecting section to detect the stop patterns recorded on the disk media from a read signal of the head; a data table in which set information of predetermined activating conditions to rotate the motor in a predetermined direction has been stored every different stop position obtained by a combination of the three stop patterns recorded on the disk media; an activating condition reference section to select the set information of the corresponding activating conditions by referring to the data table by the detection pattern of the stop pattern detecting section; and an activating condition setting section to set the set information selected by the activating condition reference section to a controller of the DC motor, thereby activating the motor.

The stop pattern detecting section sequentially switches and selects one of the heads corresponding to at least the three medium surfaces on which the stop patterns were recorded in a motor stop state, thereby detecting each stop pattern. When the stop pattern cannot be detected, a spare stop pattern recorded on another medium surface is detected. In the case where the head is positioned in a boundary portion of the stop pattern and the stop pattern cannot be normally detected, the current is supplied into predetermined two coils among the three-phase coils of the DC motor and the head is positioned and, after that, the detection is again performed.

The set information indicative of the two coils to which the current is supplied among the three-phase coils of the DC motor and the current direction has been stored in the data table every different stop position obtained by the combination of the three stop patterns recorded on the disk media.

According to the disk apparatus of the invention, by recording the stop patterns that can be read in the motor stop state onto the disk media, the stop pattern at the head stop position is read and the position of the head can be recognized. Therefore, if the relation of the relative positions of the medium and the spindle motor for the head has previously been decided or is divided after the assembly, the stop position of the rotor provided for the spindle motor for the stator coil that is necessary for activation control of the rotor can be detected. Thus, on the basis of the detection of the stop position of the rotor, from which coil the current is supplied at the time of the activation of the motor for the forward rotation can be decided, so that the motor can be activated so as to certainly forwardly rotate. The sync control is performed until the counter electromotive force detection signal is obtained. When the counter electromotive force detection signal is made valid by an increase in rotational speed, the control mode is switched from the sync control to the rotation control based on the counter electromotive force detection signal, thereby leading the motor rotational speed to the specified rotation.

The above and other objects, features, and advantages of the present invention will become more apparent from the following detailed description with reference to the drawings.

BRIEF DESCRIPTION OF THE DRAWINGS

FIG. 15 is an explanatory diagram of table information for setting the activating conditions.

DETAILED DESCRIPTION OF THE PREFERRED EMBODIMENT

Figure 1:
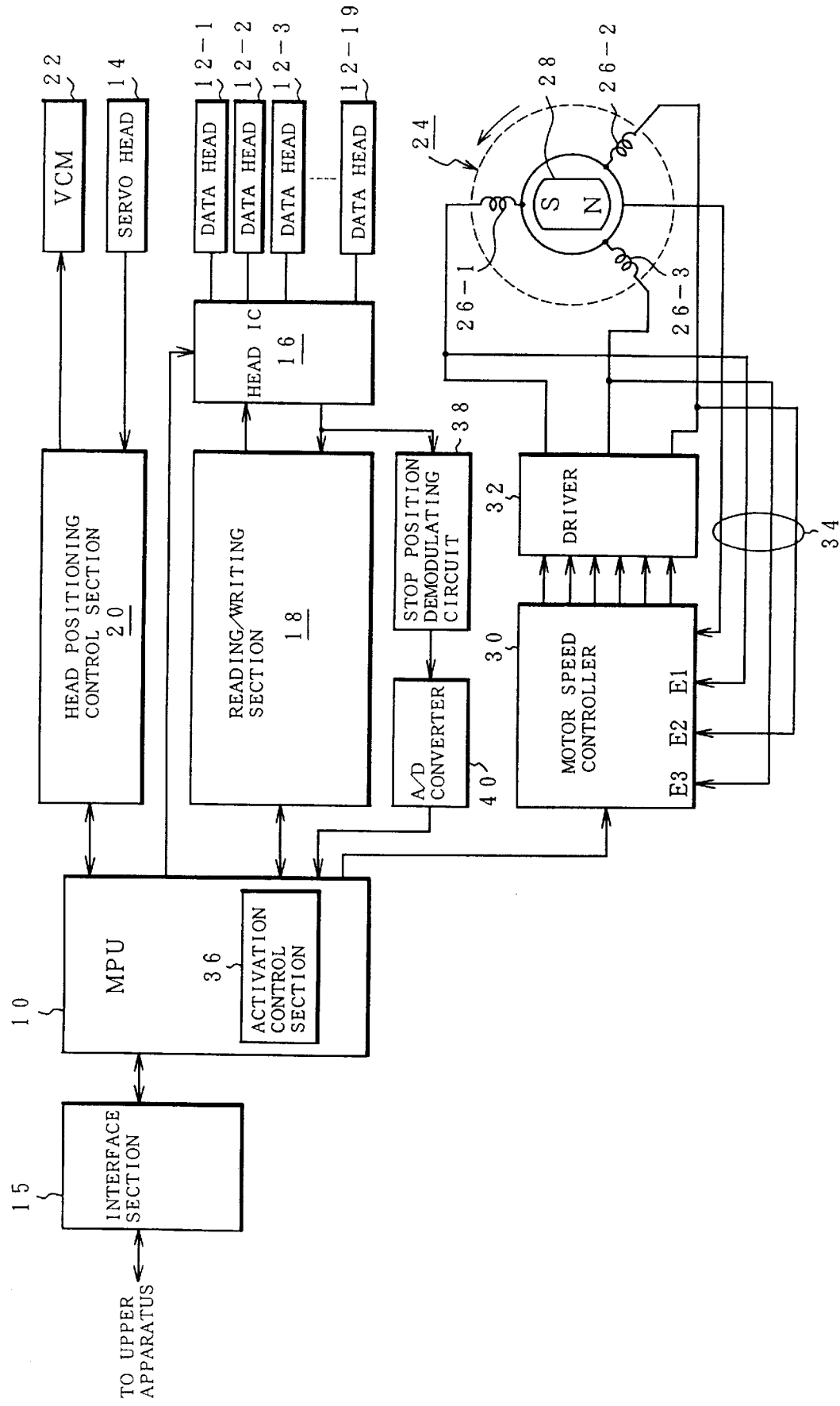
FIG. 1 is a block diagram of a disk apparatus to which the present invention is applied.

FIG. 1 shows an embodiment of the invention using a magnetic disk apparatus as an example. An MPU 10 functions as a controller and executes a whole control necessary for the magnetic disk apparatus. Data heads 12-1 to 12-19 and a servo head 14 are provided as heads for a magnetic disk. The data heads 12-1 to 12-19 read and write data for data surfaces of disk media. The servo head 14 reads out servo information recorded on a servo surface in the disk medium. The data heads 12-1 to 12-19 are connected to a head IC 16 and one of the data heads is selected by a switching signal from the MPU 10. A reading head and a writing head are individually provided for each of the data heads 12-1 to 12-19. In recent years, the writing head is the same magnetic head as a conventional head. As for the reading head, an MR head using a megneto-resistance device is used, thereby realizing a miniaturization. What is called an in-gap MR head in which the writing head and reading head are integrated is also used. Such an in-gap MR head has a structure in which the MR head functioning as a reading head is integrally arranged in the gap of the magnetic head constructing of the writing head. A reading/writing section 18 performs a reading operation or writing operation for the disk medium by using one of the data heads selected by the head IC 16 under the control of the MPU 10. A head positioning control section 20 forms a head position signal on the basis of the servo information from the servo head 14 and drives a voice coil motor (VCM) 22 to position the head at a target cylinder position.

According to the embodiment, a three-phase and two-pole brushless DC motor 24 is used as a spindle motor for rotating the disk media. In the brushless DC motor 24, stator coils 26-1, 26-2, and 26-3 are connected in a star connection manner. A rotor 28 is a two-pole rotor in which the S and N poles are arranged so as to face each other for a rotation center. Further, a Hall sensor is not assembled in the brushless DC motor 24. The brushless DC motor 24 is driven by a motor speed controller 30 and a driver 32. For example, SSI32M595 made by Silicon Systems Co., Ltd. can be used as a motor speed controller 30. According to such an LSI, detection signals of counter electromotive forces which are induced in the stator coils 26-1 to 26-3 of the brushless DC motor 24 by the rotation of the rotor 28 are fetched as counter electromotive force detection signals E1, E2, and E3 by signal lines 34. On the basis of the three-phase counter electromotive detection signals E1 to E3, a timing signal for switching current supplies to the stator coils 26-1 to 26-3 is supplied to the driver 32. Although a square wave pulse amplitude control for amplitude controlling in accordance with a deviation signal for the target rotation is used as a control of a coil driving current, a duty ratio control can also be used.

According to the invention, further, in order to perform an activation control for detecting the stop patterns recorded on the disk media and allowing the brushless DC motor 24 to always be rotated in a specified direction, a stop position demodulating circuit 38 and an activation control section 36 which is realized by the functions of an A/D converter 40 and MPU 10 are provided.

Figure 2:
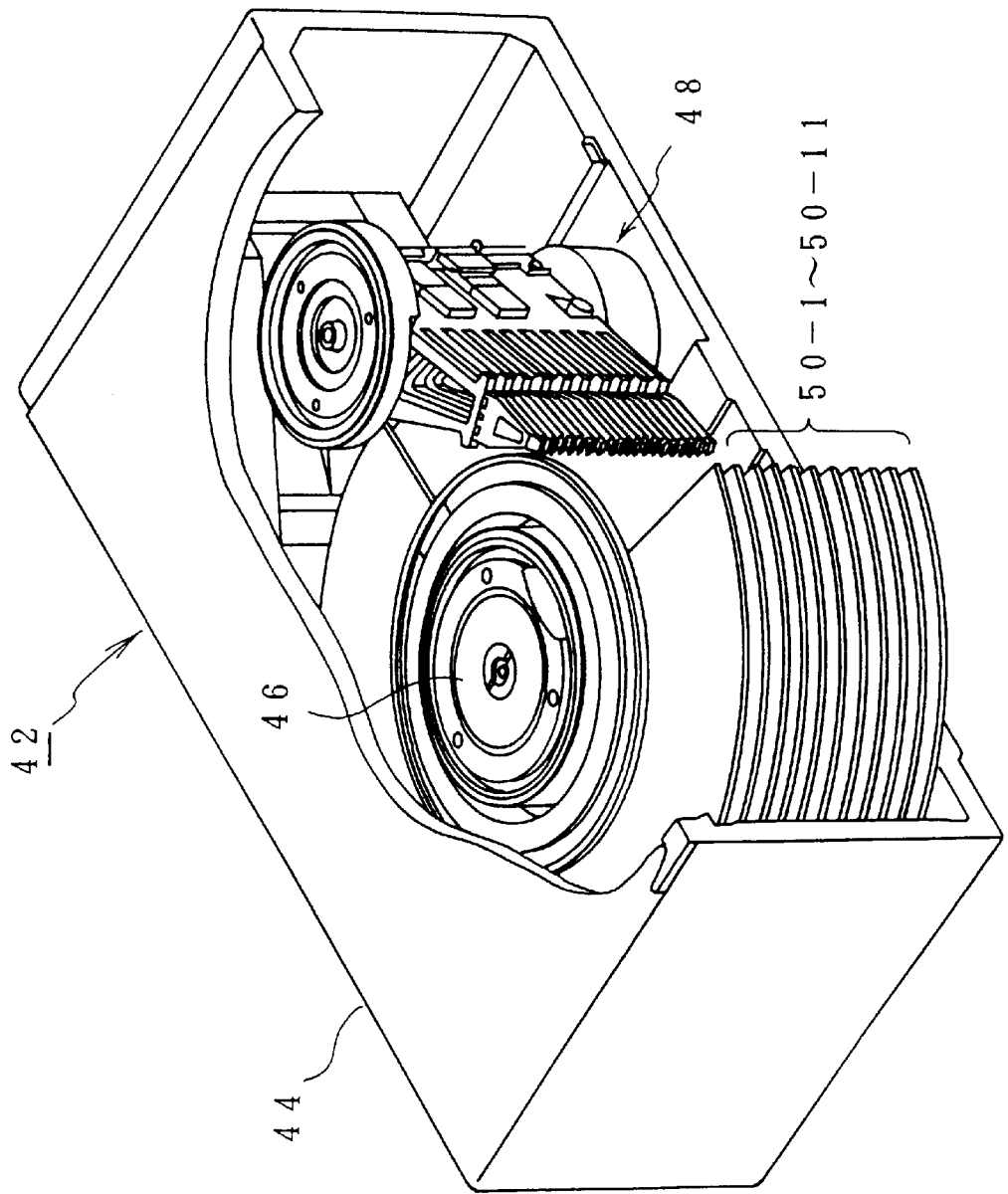
FIG. 2 is an explanatory diagram of a structure of a disk enclosure.

FIG. 2 shows a structure of a disk enclosure in the disk apparatus of the invention with a part cut away. Eleven magnetic disks 50-1 to 50-11 are rotatably assembled in a disk enclosure 42 by a support of a rotary shaft 46 and are rotated by a spindle motor (not shown) provided on the lower side. According to the invention, as shown in FIG. 1, the brushless DC motor 24 is used as such a spindle motor. A head actuator 48 is provided on the right side of the magnetic disks 50-1 to 50-11 and an edge of each head can be integratedly moved in the radial direction of each medium surface of the magnetic disks 50-1 to 50-11.

Figure 3:
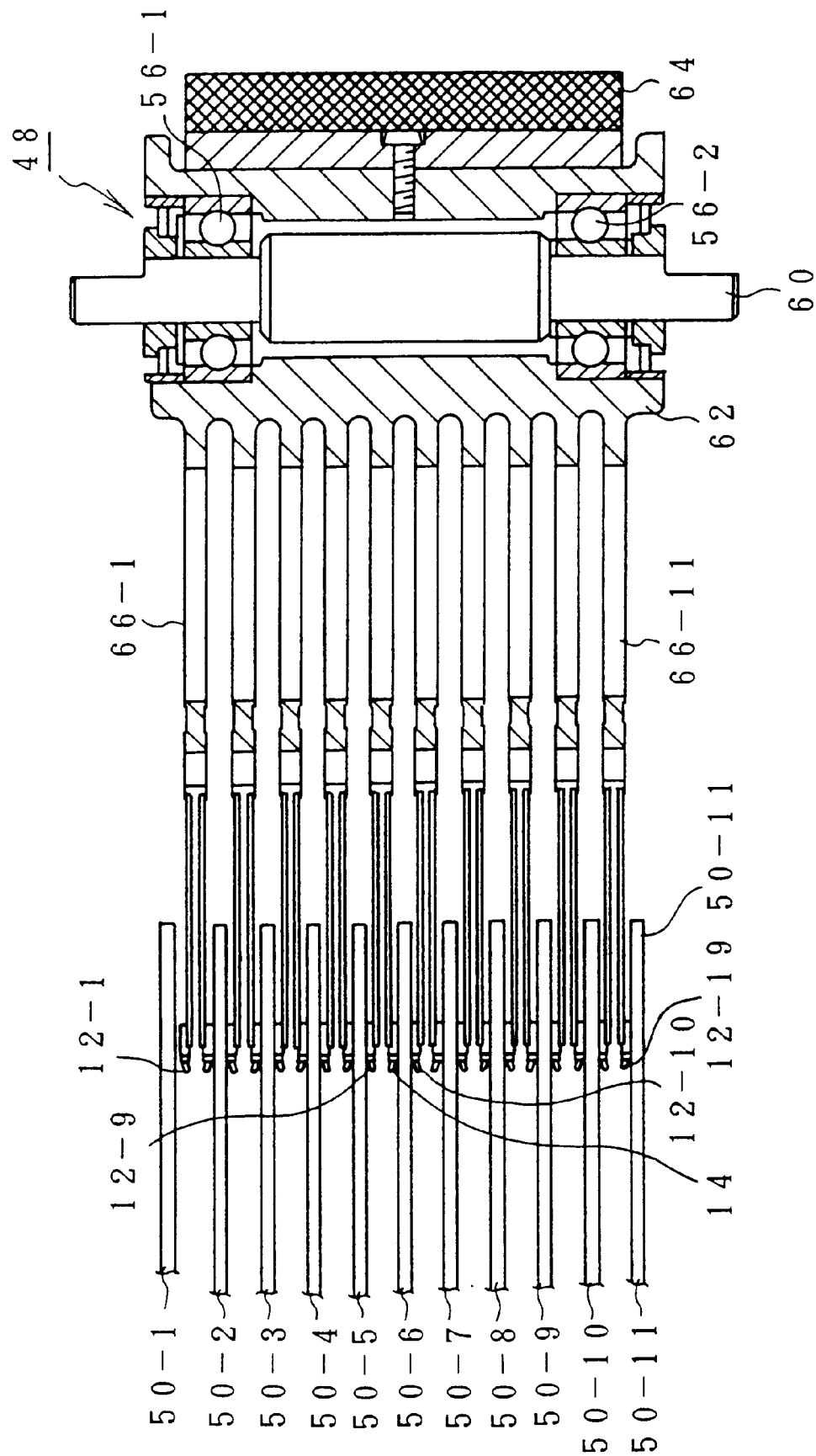
FIG. 3 is a side sectional view of a head actuator in FIG. 2.

FIG. 3 shows a cross sectional view of the head actuator 48 in FIG. 2. In the head actuator 48, a block 62 is rotatably attached to a fixedly arranged shaft 60 through upper and lower bearings 56-1 and 56-2. A movable coil 64 of the voice coil motor 22 is arranged on the right side of the block 62. Eleven arms 66-1 to 66-11 are extended on the left side of the block 62. Two heads are supported through a pair of spring arms at the edge of each of the arms 66-1 to 66-11. In the embodiment, twenty heads are provided for the eleven magnetic disks 50-1 to 50-11. The upper nine heads among those heads are data heads 12-1 to 12-9 and the servo head 14 is subsequently provided. The remaining ten heads subsequent to the servo head 14 are the data heads 12-10 to 12-19. The disk surfaces of the magnetic disks 50-1 to 50-11 which the data heads 12-1 to 12-19 face are the data surfaces which are used to read and write data. On the other hand, an upper medium surface of the magnetic disk 50-6 at which the servo head 14 is located is the servo surface in which the servo information has been recorded in the whole track. In this instance, the reason why the medium surface of the center magnetic disk 50-6 is set to the servo surface which the servo head 14 faces is because a distance up to each of the farthest magnetic disks 50-1 and 50-11 is minimized by positioning the servo surface at the center and an offset amount which causes a position fluctuation of each data surface for the servo surface by a mechanical deformation depending on a temperature change is minimized.

Figure 4:
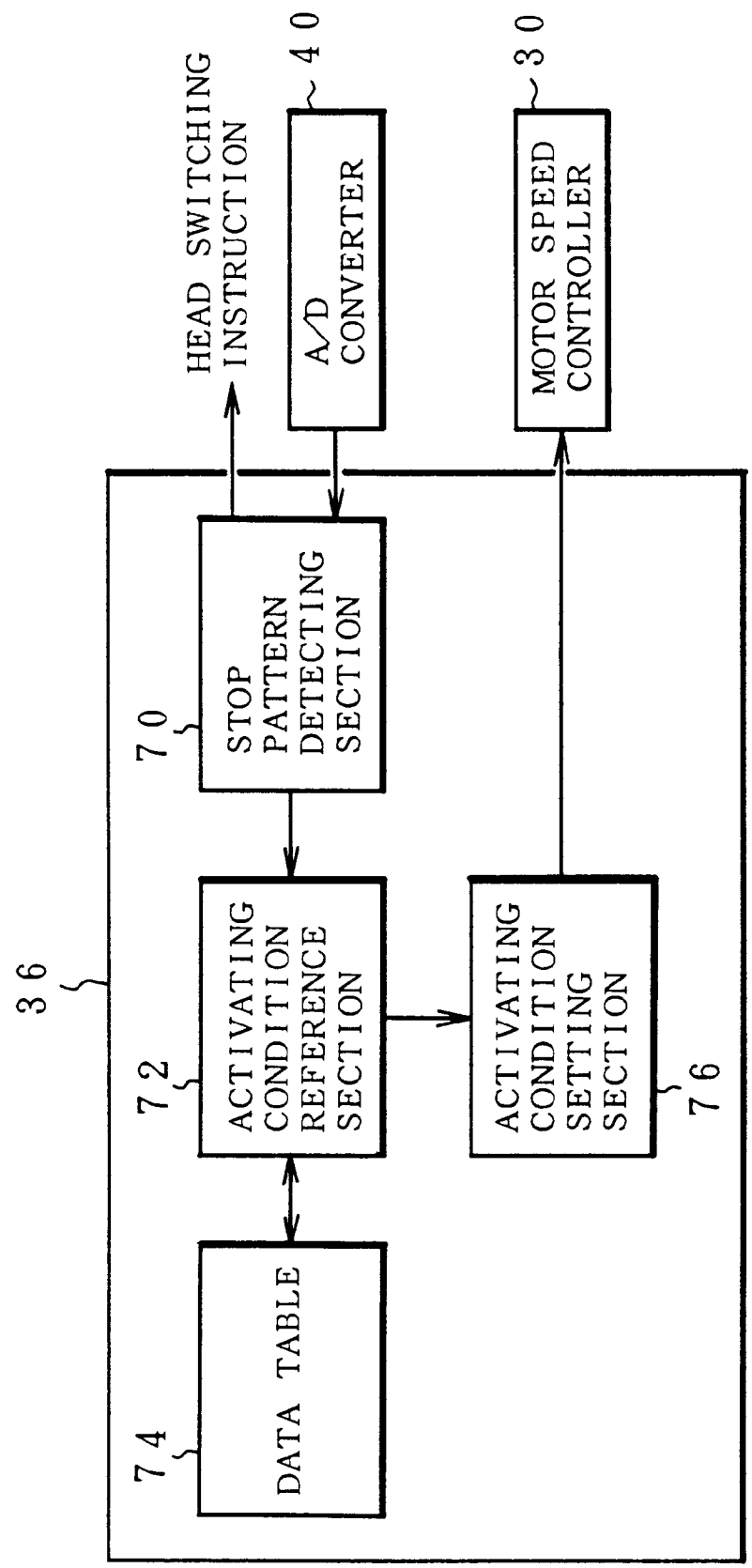
FIG. 4 is a block diagram of functions of an activation control section in FIG. 1.

FIG. 4 is a functional block diagram of the activation control section 36 provided for the MPU 10 in FIG. 1. In order to activate the brushless DC motor 24 without reversely rotating, the activation control section 36 comprises: a stop pattern detecting section 70; an activating condition reference section 72; a data table 74; and an activating condition setting section 76. The stop pattern detecting section 70 fetches the read signals of the stop patterns recorded on the data surface of the magnetic disk, which will be obviously explained later, through the A/D converter 40, thereby detecting the stop pattern indicative of the head stop position. The activating condition reference section 72 refers to the data table 74 by the detected stop patterns, reads out the activating conditions to forwardly rotate the spindle motor at the present head stop position without reversely rotating, and supplies to the activating condition setting section 76. Information indicative of the predetermined activating conditions has been stored in the data table 74 for every different stop pattern. The set information indicative of the activating conditions is the information showing the two coils to which the current is supplied among the three stator coils 26-1 to 26-3 of the brushless DC motor 24 and the current direction.

Figure 5:
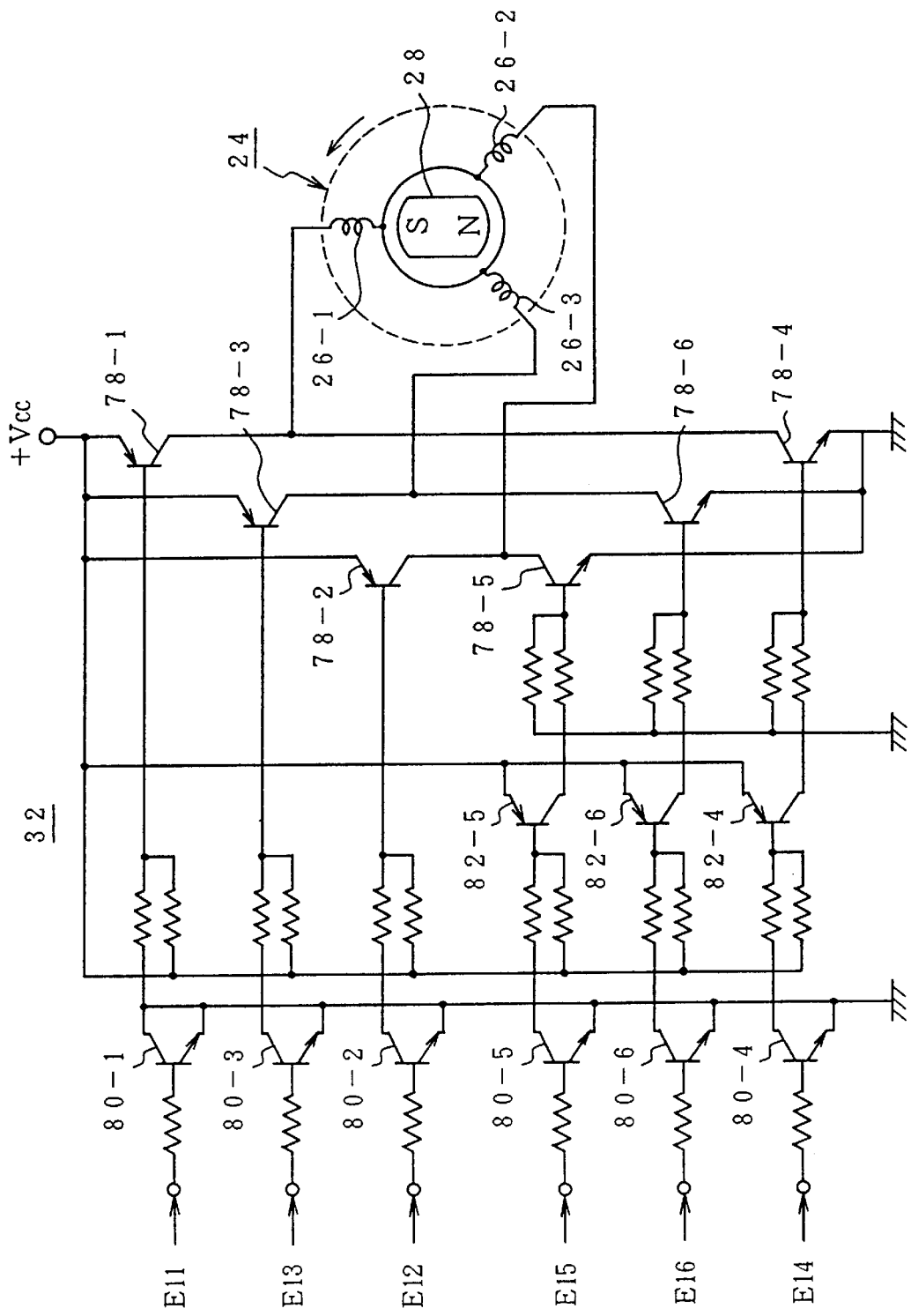
FIG. 5 is a circuit diagram of a driver in FIG. 1.

FIG. 5 shows a circuit of the driver 32 in FIG. 1 together with the brushless DC motor 24. A serial circuit of transistors 78-1 and 78-4 is provided in correspondence to the stator coil 26-1 at an output stage of the driver 32. A serial circuit of transistors 78-2 and 78-5 is provided in correspondence to the stator coil 26-2. Further, a serial circuit of transistors 78-3 and 78-6 is provided in correspondence to the stator coil 26-3. The transistors 78-1 to 78-3 are the transistors on the inflow side to supply the current into the stator coils 26-1 to 26-3. On the other hand, the transistors 78-4 to 78-6 are the transistors for allowing the current to flow out of the stator coils 26-1 to 26-3. The transistors 78-1 to 78-3 on the inflow side are turned on/off by transistors 80-1 to 80-3 for driving which are provided at the front stage. On the other hand, the transistors 78-4 to 78-6 on the outflow side are driven by two-stage transistors 80-4 to 80-6 and 82-4 to 82-6 for driving which are provided at the front stage. Control signals E11 to E16 are supplied to the transistors 80-1 to 80-6 for driving at the first stage by the motor speed controller 30 in FIG. 1. The transistors 78-4 to 78-6 on the outflow side are amplitude controlled by the control signals E14 to E16. Consequently, as for the outflow side, driver stages of the two stage transistors 80-4 to 80-6 aid 82-44 to 82-6 are provided as shown in the diagram.

Figure 6:
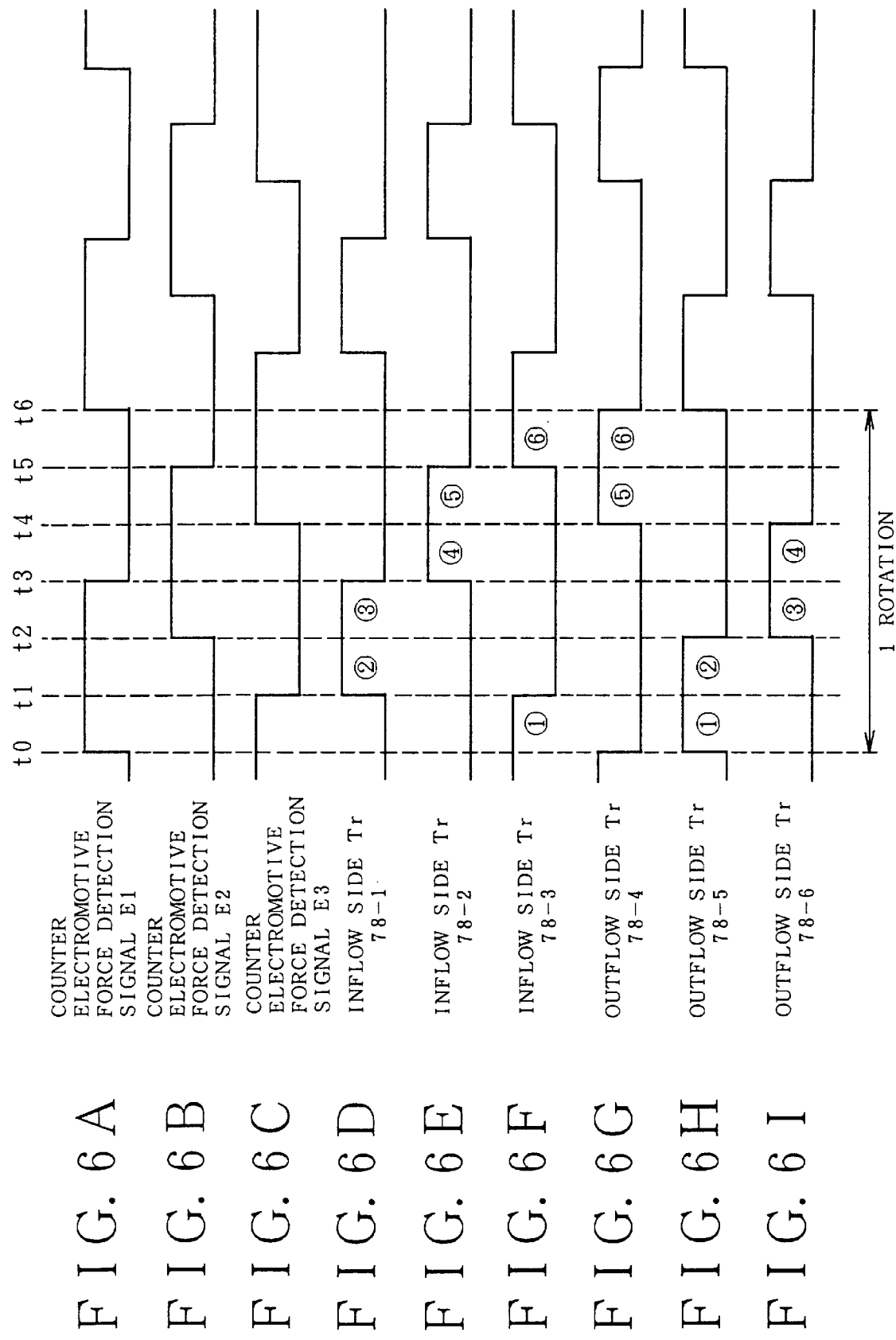
FIGS. 6A to 6I are timing charts for the operation of the driver at the time of a stationary rotation.

Timing charts of FIGS. 6A to 6I show a state in which the brushless DC motor 24 is stationarily rotated by the driver 32 in FIG. 5 on the basis of the counter electromotive force detection signals. In the stationary rotation, as shown in FIGS. 6A, 6B, and 6C, the counter electromotive force detection signals E1, E2, and E3 by the rotation of the rotor 28 of the stator coils 26-1 to 26-3 are normally obtained. The counter electromotive force detection signals E1 to E3 are generated when the magnetic field which is generated by the rotation of the rotor 28 transverses the remaining one coil in the current non-supplying state at the current supply timings for two coils among the three stator coils and have phase differences of 120° according to the coil arrangement. The motor speed controller 30 in FIG. 1 generates the control signals E11 to E16 to the driver 32 on the basis of the counter electromotive force detection signals E1 to E3 and repetitively produces six switching timings shown in (1) to (6) in FIGS. 6D to 6I every rotation, thereby stationarily rotating the motor. That is, at the timing (1) between t0 and t1, the transistor 78-2 on the inflow side and the transistor 78-6 on the outflow side are turned on, so that the current flows in the stator coil 26-3 from the stator coil 26-2. At the next timing (2) between t1 and t2, the transistor 78-1 on the inflow side and the transistor 78-6 on the outflow side are turned on, so that the current flows in the stator coil 26-3 from the stator coil 26-1. At the timing (3), the current flows from the stator coil 26-1 to the stator coil 26-2. At the timing (4), the current flows from the stator coil 26-3 to the stator coil 26-2. At the timing (5), the current flows from the stator coil 26-3 to the stator coil 26-1. At the timing (6), further, the current flows from the stator coil 26-2 to the stator coil 26-1. A rotational magnetic field is generated by such a switching of the currents to the two coils among the three stator coils 26-1 to 26-3, thereby rotating the rotor 28 in accordance with the rotational magnetic field. As for a speed control to set the deviation that is detected as a phase difference of the counter electromotive force detection signals E1 to E3 for the target speed to zero, the control signals E14 to E16 for the transistors 78-4 to 78-6 on the outflow side are amplitude controlled by the gain according to a phase amount caused as a deviation.

Figure 7:
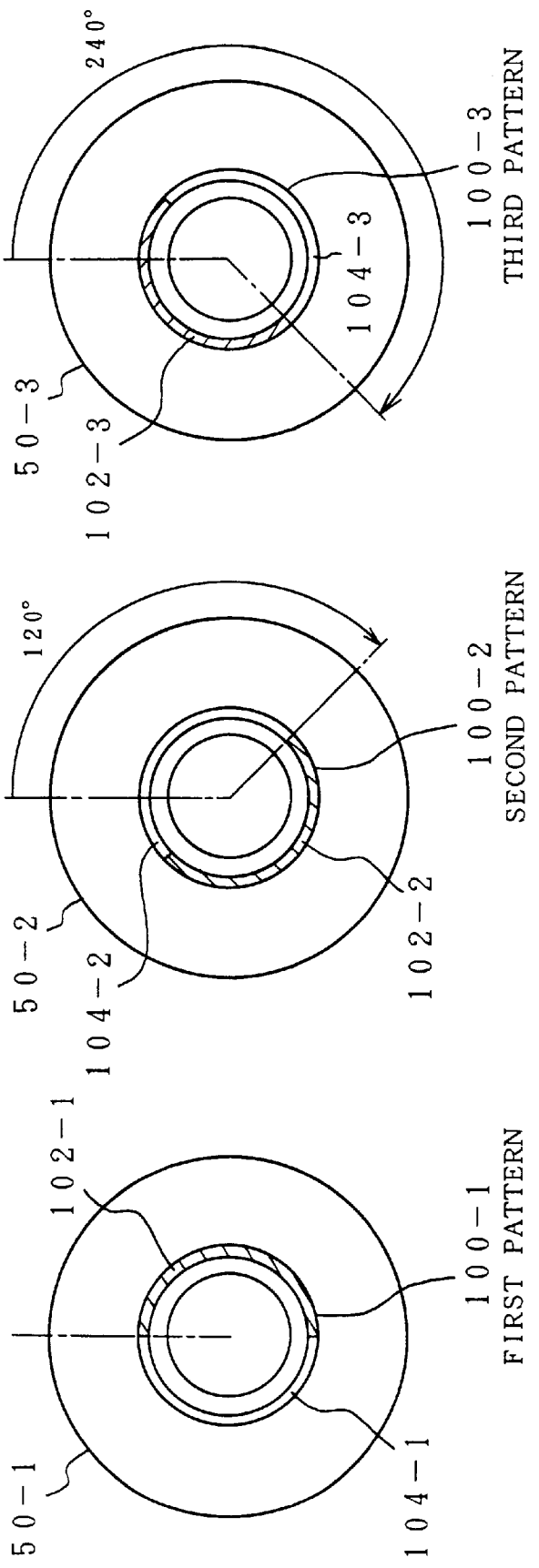
FIGS. 7A to 7C are explanatory diagrams of the stop patterns of disk media.

FIGS. 7A to 7C show stop patterns which are previously recorded to three of a plurality of magnetic disks in order to detect the stop position of the motor. In the embodiment, as shown in FIGS. 7A to 7C, a first pattern 100-1, a second pattern 100-2, and a third pattern 100-3 are previously recorded as stop patterns on the three magnetic disks 50-1, 50-2, and 50-3, respectively. In the patterns 100-1 to 100-3, each record of one circumference is divided into two portions, one of them is magnetized to the N pole, thereby forming N polarity patterns 102-1 to 102-3, and the remaining half portion is magnetized to the S pole, thereby forming S polarity patterns 104-1 to 104-3. Further, phases of the patterns 100-1 to 100-3 are sequentially deviated every 120°. Namely, when the first pattern 100-1 is seen as a reference, the phase of the second pattern 100-2 is deviated clockwise by 120° and, further, the phase of the third pattern 100-3 is deviated clockwise by 240°. Such a phase deviation of every 120° corresponds to a point that the three stator coils 26-1 to 26-3 are provided at intervals of 120° for the brushless DC motor 24 shown in FIG. 1. Further, as cylinder positions of the patterns 100-1 to 100-3, when the spindle motor stops, the heads are forcedly positioned to the innermost contact start/stop regions of the disk media and is stopped in contact with the disk surface. Therefore, the patterns 100-1 to 100-3 are recorded to the cylinders included in the start/stop region. The number of cylinders on which the patterns 100-1 to 100-3 are recorded can be set to 1 or a plural number. Further, in order to detect the stop position in the invention, it is necessary to record the stop patterns to at least three magnetic disks. However, to provide a redundancy, it is also possible to further provide a spare disk medium and to record another spare stop pattern.

Figure 8:
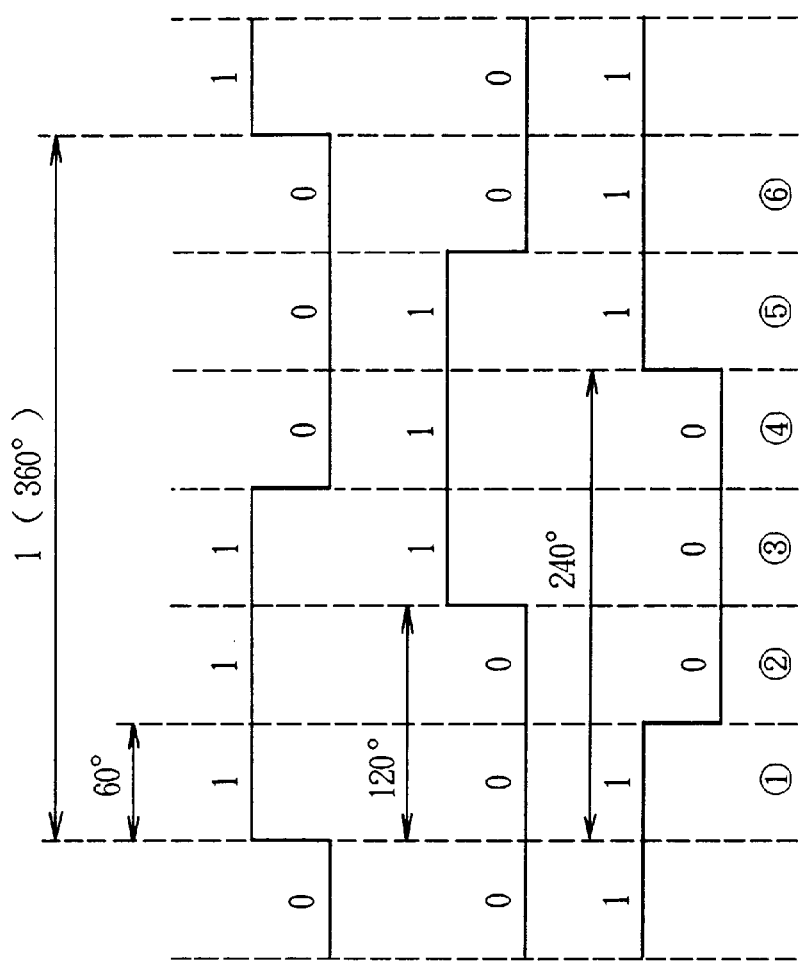
FIGS. 8A to 8C are timing charts of detection signals of the stop patterns in FIGS. 7A to 7C.

FIGS. 8A to 8C show detection signals when the three kinds of stop patterns of FIGS. 7A to 7C, namely, the first pattern 100-1, second pattern 100-2, and third pattern 100-3 are read out by the heads by once rotating the motor. The recorded portion of the N pole of each pattern is set to the logical level 1 and the recorded portion of the S pole is set to the logical level 0. FIG. 8A shows the detection signal of the first pattern 100-1 in FIG. 7A, the former half portion of 180° in one rotation is set to the logical level 1, and the latter half portion of 180° is set to the logical level 0. FIG. 8B shows the detection signal of the second pattern 100-2 of FIG. 7B and it rises from the logical level 0 to the logical level 1 with a delay of 120° for the first pattern detection signal. FIG. 8C shows the detection signal of the third pattern 100-3 of FIG. 7C and it changes from the logical level 0 to the logical level 1 with a phase delay of 240° for the first pattern detection signal. By such three pattern detection signals, one rotation can be recognized as a combination of six different detection patterns shown in (1) to (6), namely, as pattern information of three bits.

FIGS. 9 to 14 show the pattern detection information of three bits of FIGS. 8A to 8C and current supplying conditions to the stator coils for activating the motor in the correct specified direction without reversely rotating. In those diagrams, for example, when seeing FIG. 9, the three patterns 100-1 to 100-3, which are actually arranged at the same cylinder position, are shown on a virtual magnetic disk 50 so as to be located on the concentric circles for simplicity of explanation. The rotor 28 of the brushless DC motor is shown so as to be rotated integrally with the virtual magnetic disk 50. For the magnetic disk 50 which is rotated by the rotor 28, the stator coils 26-1 to 26-3 are shown as a fixed side in the outside. Further, an index 52 is shown to easily understand a difference of the stop position of the magnetic disk 50. It is also assumed that the data heads 12-1 to 12-3 to read the patterns 100-1 to 100-3 are arranged clockwise in the direction of 30° for the stator coil 26-1.

Figure 9:
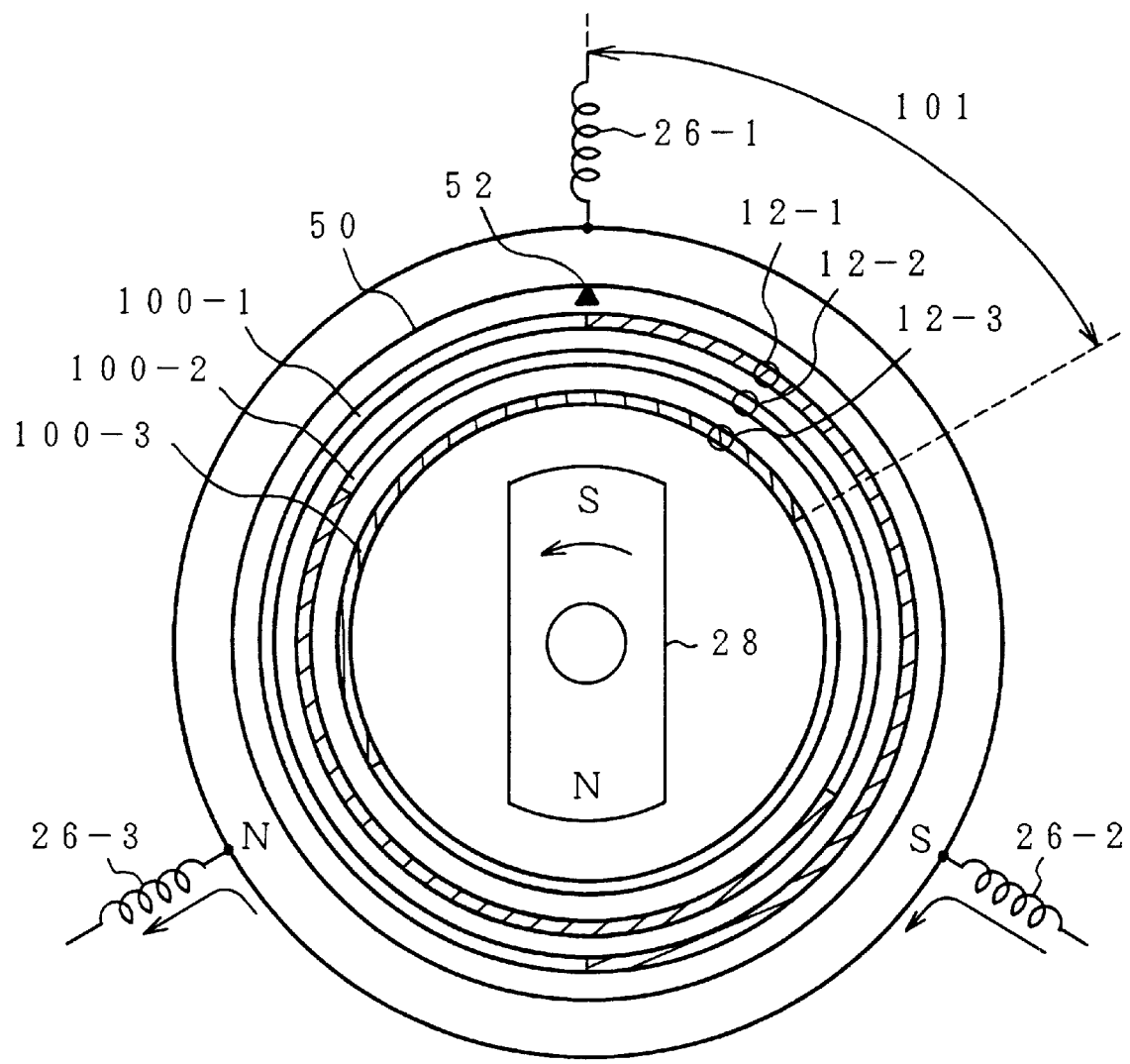
FIG. 9 is an explanatory diagram of activating conditions of pattern information 101.

In FIG. 9, the rotor 28 is stopped so that the S pole faces the stator coil 26-1. The specified rotating direction of the motor now assumes counterclockwise (leftward rotation). To rotate the rotor 28 leftward at the stop position, it is sufficient to form the S pole by supplying the current from the stator coil 26-2 and to form the N pole by flowing the current out of the stator coil 26-3. Thus, the N pole of the rotor 28 is attracted to the S pole of the stator coil 26-2. At the same time, the N pole of the rotor 28 repulses the N pole of the stator coil 26-3, so that the rotor 28 starts to rotate counterclockwise. In this instance, the read information of the patterns 100-1 to 100-3 by the data heads 12-1 to 12-3 due to the stop position of the rotor 28 is set to "101". A range where the read pattern "101" is obtained is set to a clockwise range of 60° for the index 52 and corresponds to the range of (1) in FIGS. 8A to 8C. In the case where the three detection patterns are equal to "101", therefore, it is sufficient to set the activating conditions for supplying the current from the stator coil 26-2 to the stator coil 26-3 as shown in FIG. 9.

Figure 10:
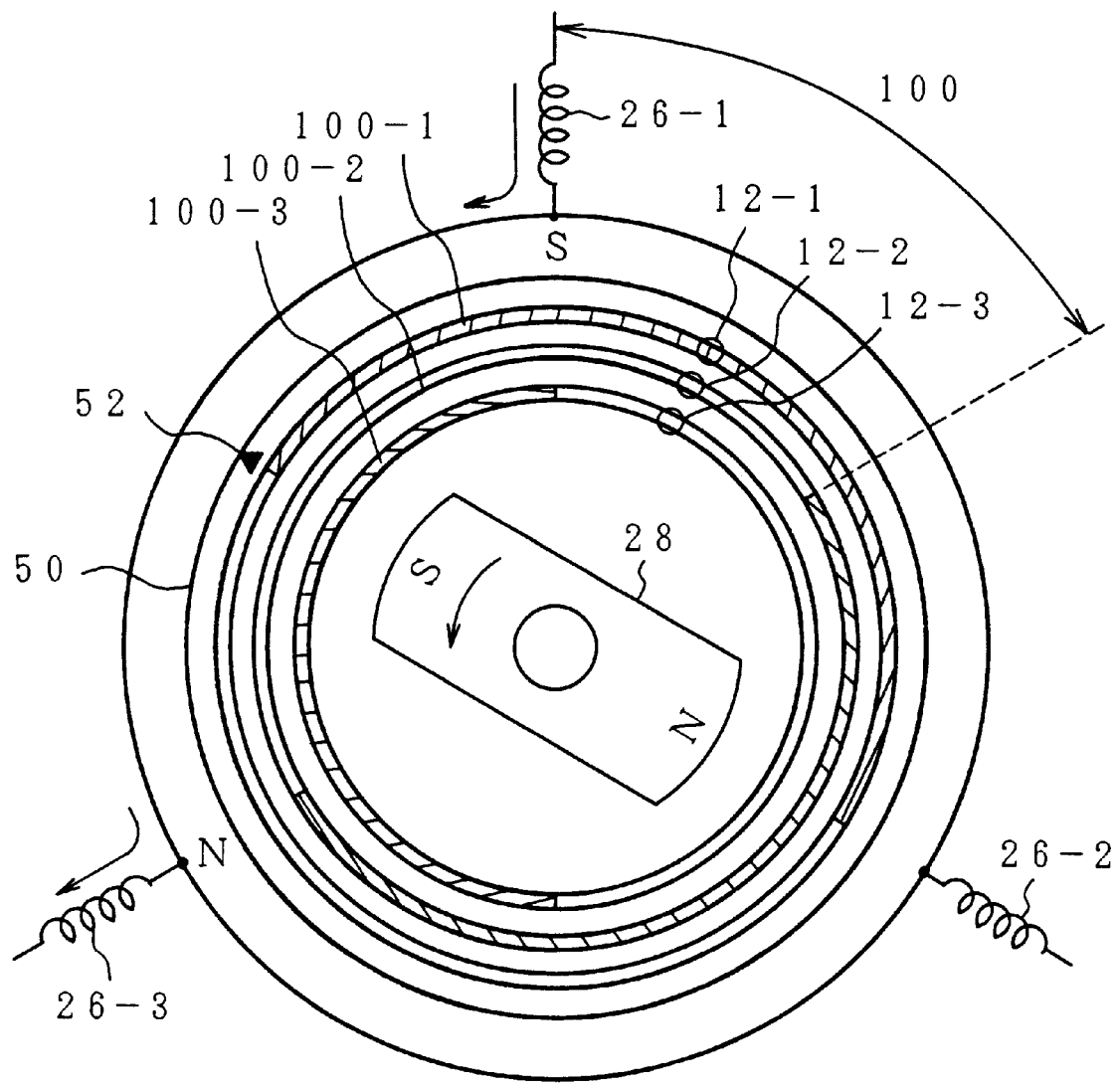
FIG. 10 is an explanatory diagram of activating conditions of pattern information 100.

FIG. 10 shows the activating conditions when the rotor 28 is stopped at the position that is counterclockwise deviated by 60° from FIG. 9. The detection information of the patterns 100-1 to 100-3 by the data heads 12-1 to 12-3 in this instance is equal to "100". To activate the rotor 28 counterclockwise in this state, it is sufficient to set the activating conditions to supply the current from the stator coil 26-1 to the stator coil 26-3. It corresponds to the state of (2) in FIGS. 8A to 8C.

Figure 11:
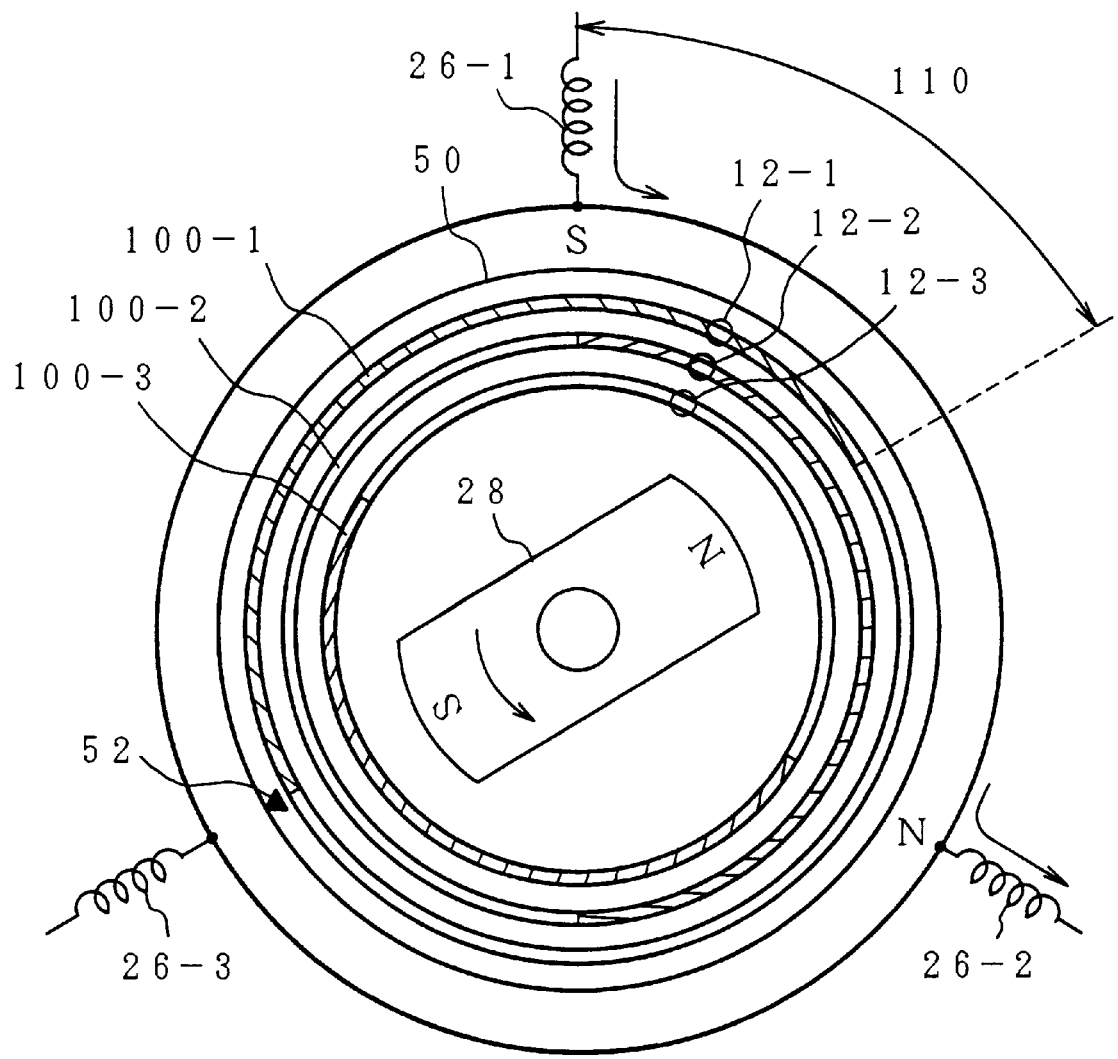
FIG. 11 is an explanatory diagram of activating conditions of pattern information 110.

FIG. 11 shows the activating conditions when the rotor 28 is stopped at the position that is further deviated counterclockwise by 60° from FIG. 10. The detection information of the patterns 100-1 to 100-3 by the data heads 12-1 to 12-3 is equal to "110" and corresponds to the state of (3) in FIGS. 8A to 8C. In this case, by setting the activating conditions for supplying the current from the stator coil 26-1 to the stator coil 26-2, the rotor 28 can be activated counterclockwise.

Figure 12:
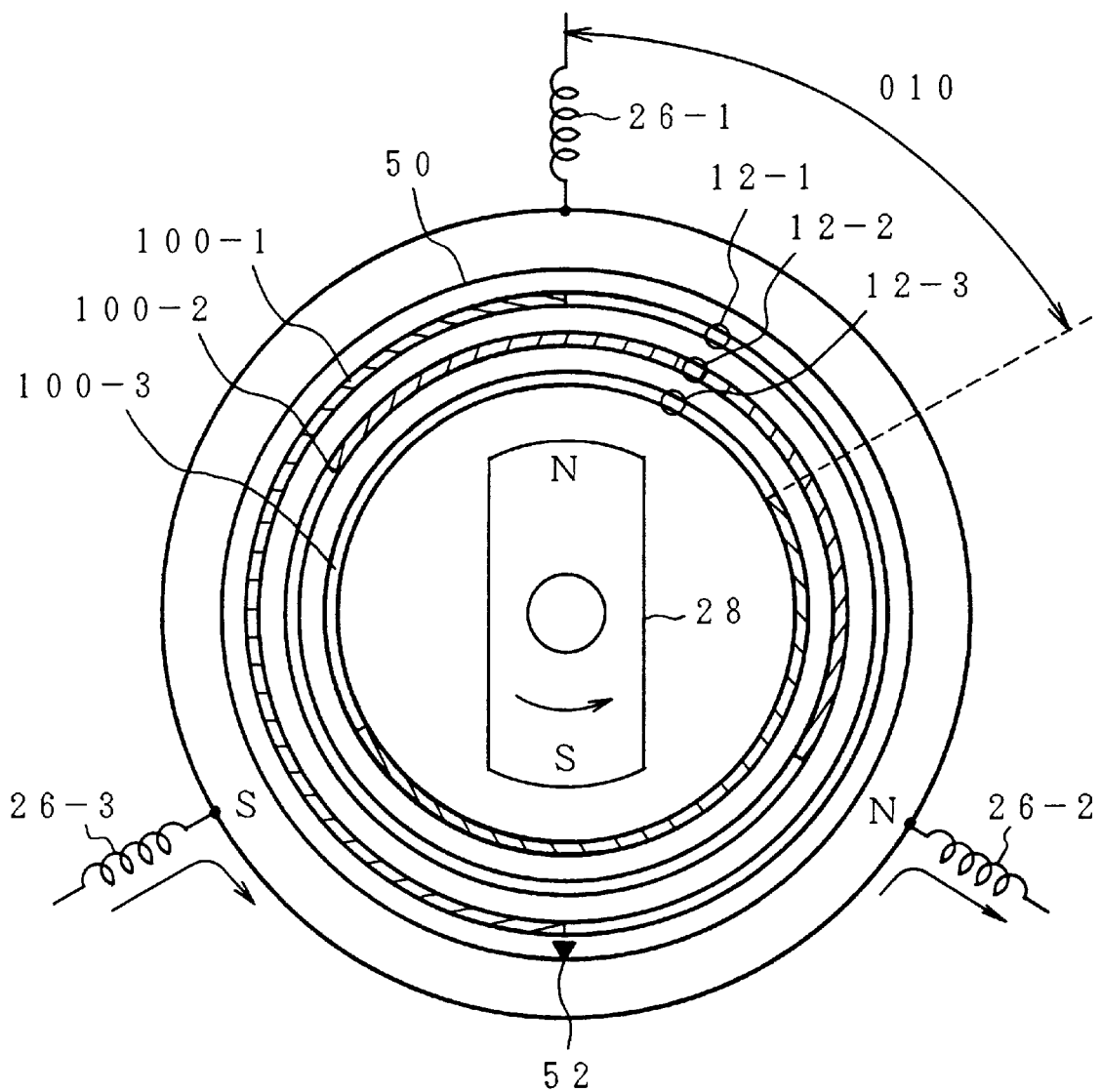
FIG. 12 is an explanatory diagram of activating conditions of pattern information 010.

FIG. 12 shows the activating conditions when the rotor 28 is stopped at the position that is further deviated counterclockwise by 60° for FIG. 11. The detection information of the patterns 100-1 to 100-3 by the data heads 12-1 to 12-3 in this instance is equal to "010" and corresponds to the detection state of (4) in FIGS. 8A to 8C. In this case, by supplying the current from the stator coil 26-3 to the stator coil 26-2, the rotor 28 can be activated counterclockwise.

Figure 13:
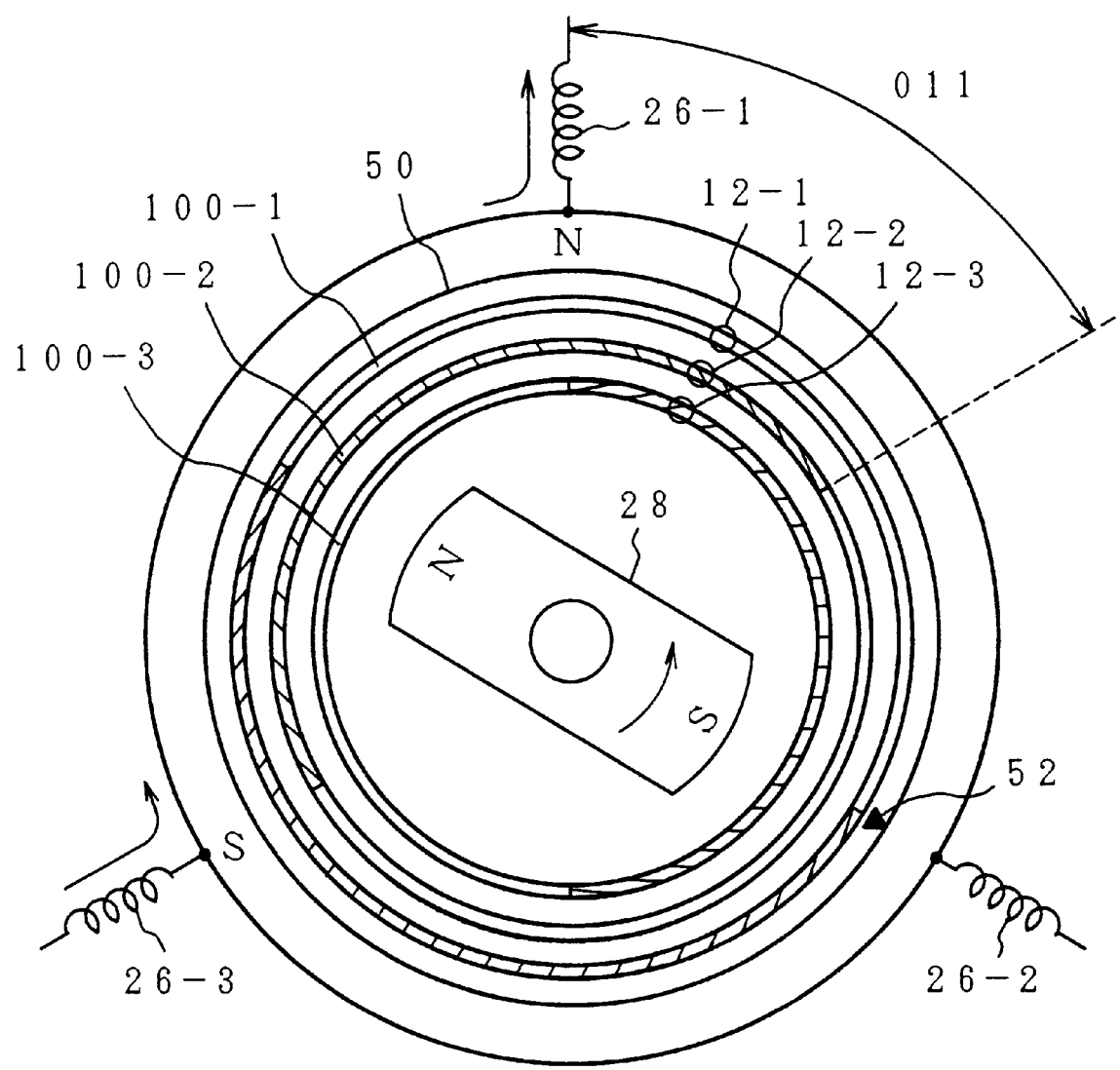
FIG. 13 is an explanatory diagram of activating conditions of pattern information 011.

FIG. 13 shows the activating conditions when the rotor 28 is stopped at the position that is further deviated counterclockwise by 60° from FIG. 12. In this instance, the detection information of the patterns 100-1 to 100-3 by the data heads 12-1 to 12-3 is equal to "011" and corresponds to the state of (5) in FIGS. 8A to 8C. In this case, by supplying the current from the stator coil 26-3 to the stator coil 26-1, the rotor 28 can be activated counterclockwise.

Figure 14:
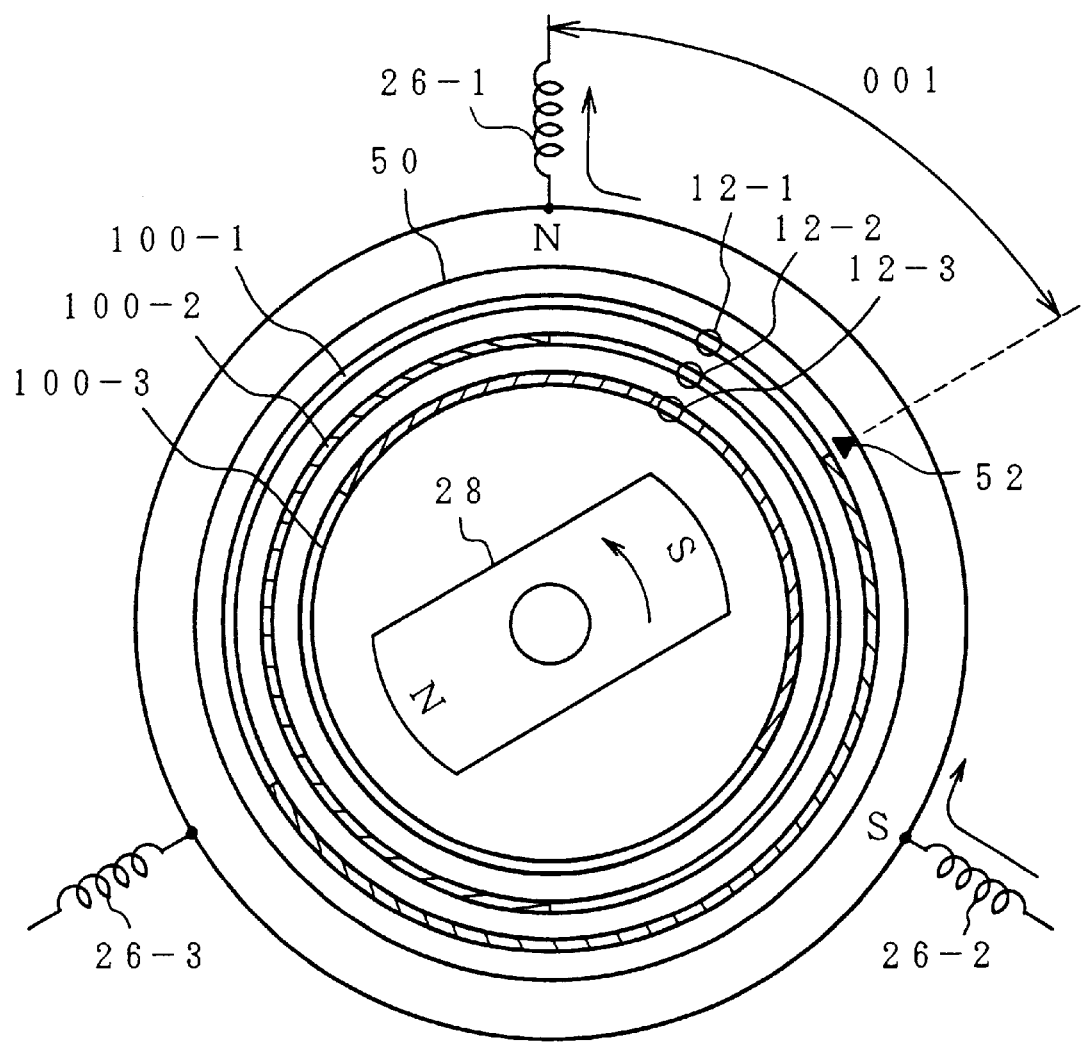
FIG. 14 is an explanatory diagram of activating conditions of pattern information 001.

FIG. 14 shows the activating conditions when the rotor 28 is stopped at the position that is further deviated counterclockwise by 60° from FIG. 13. In this instance, the detection information of the patterns 100-1 to 100-3 by the data heads 12-1 to 12-3 is equal to "001" and corresponds to the state of (6) in FIGS. 8A to 8C. In this case, by setting the activating conditions for supplying the current from the stator coil 26-2 to the stator coil 26-1, the rotor 28 can be rotated counterclockwise.

FIG. 15 shows a list of the pattern detection information of three bits at each stop position while setting the timings (1) to (6) of the pattern detection signals of FIGS. 8A to 8C and the switching timings (1) to (6) of the transistors of the output stage of the drivers in FIGS. 6A to 6I to statuses (1) to (6), the stator coils to which the coil currents as activating conditions are supplied and their current directions, and further the operating states of the transistors at the driver output stage according to the activating conditions. The table of FIG. 15 is prepared as a data table 74 of FIG. 4. By referring to the stop position detection information obtained by the stop pattern detecting section 70 by the activating condition reference section 72, the operating states of the transistors are obtained as initial conditions and are set into the motor speed controller 30 by the activating condition setting section 76.

Figure 16:
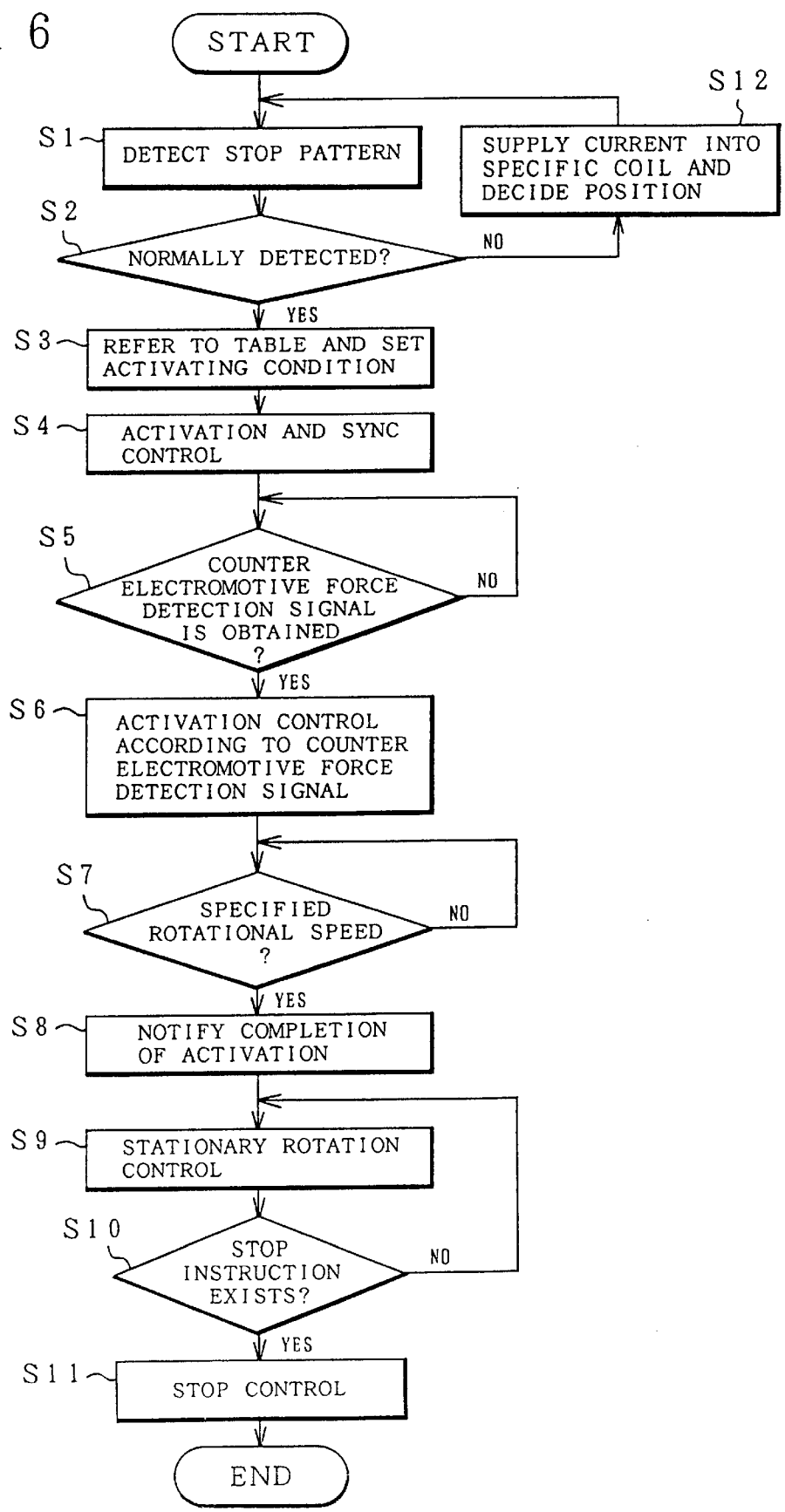
FIG. 16 is a flowchart for an activation control of the invention.

A flowchart of FIG. 16 shows the activation control according to the invention. When the power-on start by the turn-on of the power source is performed by an instruction from an upper controller or by the operator, three stop patterns recorded on the disk media are first detected in step S1. When the stop patterns are normally detected in step S2, the data table 74 is referred and the activating conditions obtained from the table, namely, the switching conditions of the transistor at the first output stage in the driver 32 are set into the motor speed controller 30. In step S4, the driver 32 is driven by the motor speed controller 30, thereby starting the motor activation and sync control. The sync control is performed until the motor speed reaches the rotational speed at which the counter electromotive force detection signals from the stator coils 26-1 to 26-3 are made valid in step S5. That is, in the sync control, since there is no timing signal as a reference at the stage of such a low speed rotation, the timing signal fixedly produced from the clock pulse is used and the activating conditions set in step S3 are used as initial values and the switching operation of the transistor at the output stage of the driver 32 is executed. When the motor rotational speed rises and the valid counter electromotive force detection signals are obtained in step S5, step S6 follows. The control mode is switched to the activation control according to the counter electromotive force detection signals and the motor speed is rapidly raised to the specified rotational speed. In step S7, when the arrival at the specified rotational speed is judged, an activation completion notification called a speed lock-on signal is sent to the MPU 10 in step S8. In step S9, the stationary rotation control is started. When the stationary rotation control is started in step S9, the stop command is discriminated in step S10. When there is a stop command, the stop control is executed in step S11.

On the other hand, in the detection of the stop patterns in step S1, if the patterns cannot normally be detected in step S2, the processing routine advances to step S12 in the embodiment. The pulse current is supplied to a special pair of stator coils, namely, two predetermined coils among the three stator coils. The processing routine is again returned to step S1 and the stop patterns are detected. The pattern reading becomes impossible in the case where the boundary portion of either one of the three patterns 100-1 to 100-3 in FIGS. 7A to 7C stops just under the head. Therefore, the pulse current is forcedly supplied to deviate the stop position and the retry by the re-detection is executed. When the special stop pattern cannot be detected by the re-execution of the positioning operation in step S12, there is a defect in the record of the pattern or there is another error factor. In such a case, therefore, if a spare stop pattern has been formed on another magnetic disk, it is sufficient to detect the spare stop pattern by the head switching.

According to the invention as mentioned above, with respect to the brushless DC motor which doesn't have a Hall sensor and whose rotation is controlled on the basis of the counter electromotive force detection signals, by recording simple patterns for detection of the stop position on the rotating disk medium side and by reading such patterns in the stop state, the stop position of the motor is detected and the motor can be activated so as to always rotate in the specified direction. The reverse rotation can be perfectly prevented.

In the above embodiment, as patterns to detect the stop position, one of the two divided portions is magnetized to the N pole and the other is magnetized to the S pole. However, the intensity of the magnetization can be changed or the frequencies of the magnetic pole inversion can be made different.

Although the above embodiment has been described with respect to the servo surface servo system in which the servo information has been recorded on the exclusive-use data surface as an example, a data surface servo system in which the servo information has been recorded on the data surface can be also used.

Although the above embodiment has been described with respect to the magnetic disk apparatus as an example, the invention can be also applied as it is to an optical disk apparatus for optically reading or writing. In case of the optical disk apparatus, the stop patterns are optically recorded and are detected in a manner similar to the above.

Further, although the above embodiment has been described with respect to the 3-phase and 2-pole brushless DC motor having no Hall sensor therein, the number (n) of poles of the rotor is not limited to two but any other brushless DC motor of poles of arbitrary number such as four, six, eight, or the like can be also used.

What is claimed is:

1. A disk apparatus comprising:

a brushless DC motor having a rotor of (n) poles and three-phase coils on the stator side;

a plurality of disk media which are rotated by said DC motor, a first stop pattern being recorded on a first disk surface of said plurality of disk media, a second stop pattern being recorded on a second disk surface of said plurality of disk media and a third stop pattern being recorded on a third disk surface of said plurality of disk media, said first, second and third stop patterns being indicative of a stop position of said DC motor, and said first, second, and third patterns being divisional patterns recorded by dividing one circumference in half and said divisional patterns being recorded so as to sequentially deviate phases in the circumferential direction by 120°;

a head portion to write and read information to and from said disk media;

a head positioning section for positioning said head portion to a recording position of said stop patterns of said disk media when the motor stops and for moving and positioning said head portion to an arbitrary position on said medium surface when said DC motor is initially activated; and an activation control section for detecting the motor stop position on the basis of said stop patterns of said disk media upon activation of the motor and for setting activating conditions for rotating said motor in a predetermined direction and activating the motor.

2. An apparatus according to claim 1, wherein said disk medium is a magnetic recording medium and said division patterns are the patterns in which one circumference is divided into two portions and an S pole and an N pole are recorded therein.

3. An apparatus according to claim 1, wherein said disk medium is a magnetic recording medium and said division patterns are intensity patterns in which one circumference is divided into two portions and strong and weak states of the magnetization are recorded therein.

4. An apparatus according to claim 1, wherein said disk medium is a magnetic recording medium and said division patterns are patterns in which one circumference is divided into two portions and magnetization inversion states of different frequencies are recorded therein.

5. An apparatus according to claim 1, wherein said disk medium is an optical recording medium and said division patterns are patterns in which one circumference is divided into two portions and optically different information is recorded therein.

6. An apparatus according to claim 1, wherein each of said stop patterns of said disk medium is recorded on a cylinder of said disk media at which said head portion is positioned at the time of the stop of the rotation of said disk medium.

7. An apparatus according to claim 6, wherein said head portion is a magnetic head, and said stop pattern is recorded in a contact start/stop region of a disk surface with which said magnetic head comes into contact when the rotation of said disk medium stops.

8. An apparatus according to claim 1, wherein said stop patterns of said disk media are recorded on a plurality of cylinders of said disk media.

9. An apparatus according to claim 1, wherein said activation control section comprises:

a stop pattern detecting section for detecting said stop pattern recorded on said disk medium from a read signal of said head portion;

a data table section in which set information of predetermined activating conditions for rotating said motor in the specified direction has been stored for each stop position obtained by a combination of the three stop patterns recorded on said disk media;

an activating condition reference section for referring to said data table section by the detection patterns of said stop pattern detecting section and selecting the set information of the corresponding activating conditions; and an activating condition setting section for setting the set information selected by said activating condition reference section into a control section of said DC motor.

10. An apparatus according to claim 9, wherein said stop pattern detecting section sequentially switches and selects the head portions corresponding to at least three medium surfaces on which said stop patterns have been recorded, thereby detecting each stop pattern.

11. An apparatus according to claim 10, wherein in the case where said stop pattern cannot be detected, said stop pattern detecting section detects a stop pattern recorded on another medium surface.

12. An apparatus according to claim 10, wherein in the case where said stop pattern cannot be detected, said stop pattern detecting section again detects the stop pattern after a current was supplied to predetermined two of said three-phase coils of said DC motor and the motor was positioned.

13. An apparatus according to claim 10, wherein the set information indicative of two coils to which the current is supplied among said three-phase coils of said DC motor and its current direction has been stored in said data table section for each stop position obtained by a combination of the three stop patterns recorded on said disk media.

* * * * *